(12) United States Patent
Domenico, III et al.

(10) Patent No.: US 11,269,804 B1
(45) Date of Patent: Mar. 8, 2022

(54) HARDWARE ADAPTER TO CONNECT WITH A DISTRIBUTED NETWORK SERVICE

(71) Applicant: Amazon Technologies, Inc., Seattle, WA (US)

(72) Inventors: Calvin J. Domenico, III, Herndon, VA (US); Reto Kramer, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/284,674

(22) Filed: Feb. 25, 2019

(51) Int. Cl.
*G06F 13/42* (2006.01)
*G06F 21/85* (2013.01)

(52) U.S. Cl.
CPC .......... *G06F 13/4282* (2013.01); *G06F 21/85* (2013.01); *G06F 2213/0002* (2013.01)

(58) Field of Classification Search
CPC ............... G06F 13/4282; G06F 21/85; G06F 2213/0002
See application file for complete search history.

(56) References Cited

U.S. PATENT DOCUMENTS

| 8,515,383 | B2* | 8/2013 | Prince | H04L 12/2803 455/402 |
| 8,615,332 | B2* | 12/2013 | Heilman | H04L 69/26 700/295 |
| 8,774,143 | B2* | 7/2014 | Ansari | H04Q 9/00 370/338 |
| 9,081,703 | B2* | 7/2015 | Nair | G06F 13/102 |
| 9,083,547 | B2* | 7/2015 | Lim | H04L 12/12 |
| 9,471,775 | B1* | 10/2016 | Wagner | H04L 63/102 |
| 9,973,732 | B1* | 5/2018 | Goetz | H04N 5/23219 |
| 2008/0125912 | A1* | 5/2008 | Heilman | G04R 20/26 700/275 |
| 2013/0092032 | A1* | 4/2013 | Cafferty | F24C 7/08 99/325 |
| 2014/0180447 | A1* | 6/2014 | Chen | G05B 15/02 700/90 |

(Continued)

OTHER PUBLICATIONS

Samsung—"Samsung Smart Home Dongle—User manual—HD39J1230GW"—24 pages, Dated Dec. 23, 2015 (Year: 2015).*

(Continued)

*Primary Examiner* — Brian T Misiura
(74) *Attorney, Agent, or Firm* — Knobbe Martens Olson & Bear LLP

(57) ABSTRACT

A hardware serial adapter that can be connected to a serial port of a physical computing device and is associated with network credentials that include a unique hardware identifier and other security information. Upon receipt of data (or other initiation command), the hardware serial adapter transmits a registration request with the network credentials to a distributed network service. If the network credentials are valid, the network service provides communication channel configuration information and session credentials to establish a secure communication for the transmission of data from the hardware serial adapter to a virtual machine instance. The distributed network service can control and manage data transmissions and the communication channel.

22 Claims, 11 Drawing Sheets

(56) References Cited

U.S. PATENT DOCUMENTS

| | | | | |
|---|---|---|---|---|
| 2014/0297738 A1* | 10/2014 | King | ............... | G09B 19/0092 |
| | | | | 709/204 |
| 2017/0186079 A1* | 6/2017 | Kim | ............... | G06F 3/0488 |
| 2017/0262614 A1* | 9/2017 | Vishnubhatla | ......... | G06Q 40/08 |
| 2019/0087794 A1* | 3/2019 | Cho | ............... | G06Q 20/085 |
| 2019/0089813 A1* | 3/2019 | Choi | ............... | H04L 12/2818 |
| 2019/0305980 A1* | 10/2019 | D'Ovidio | ............ | H04L 12/2803 |

OTHER PUBLICATIONS

Samsung—"Smart Home Adapter", User Manual, HD2018GH; 20 Pages, Dated Mar. 21, 2018 (Year: 2018).*

* cited by examiner

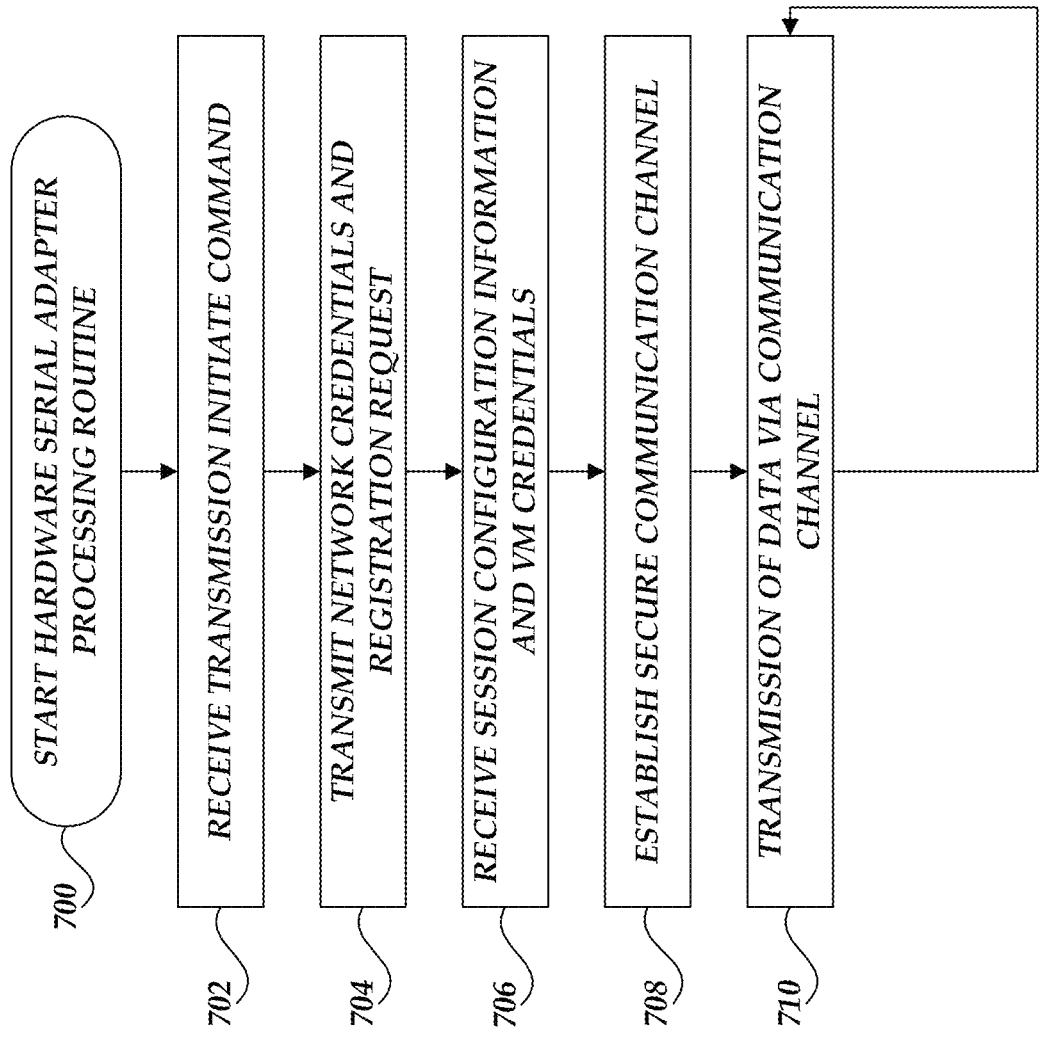

HARDWARE ADAPTER TO CONNECT WITH A DISTRIBUTED NETWORK SERVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communicate via the communication network can correspond to embedded devices or thin devices that have at least one alternative primary function, such as household appliances having a separate primary purpose (generally referred to as an Internet of Things or IOT device) while also providing at least limited computing functionality. In some instances, the local user interfaces and communication capabilities of these embedded devices or thin devices are limited and may be restricted to facilitate communication with network services or resources.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 7 is a flow diagram depicting an illustrative hardware serial adapter processing routine implemented by a hardware serial adapter in accordance with illustrative embodiments.

DETAILED DESCRIPTION

Figure 1:
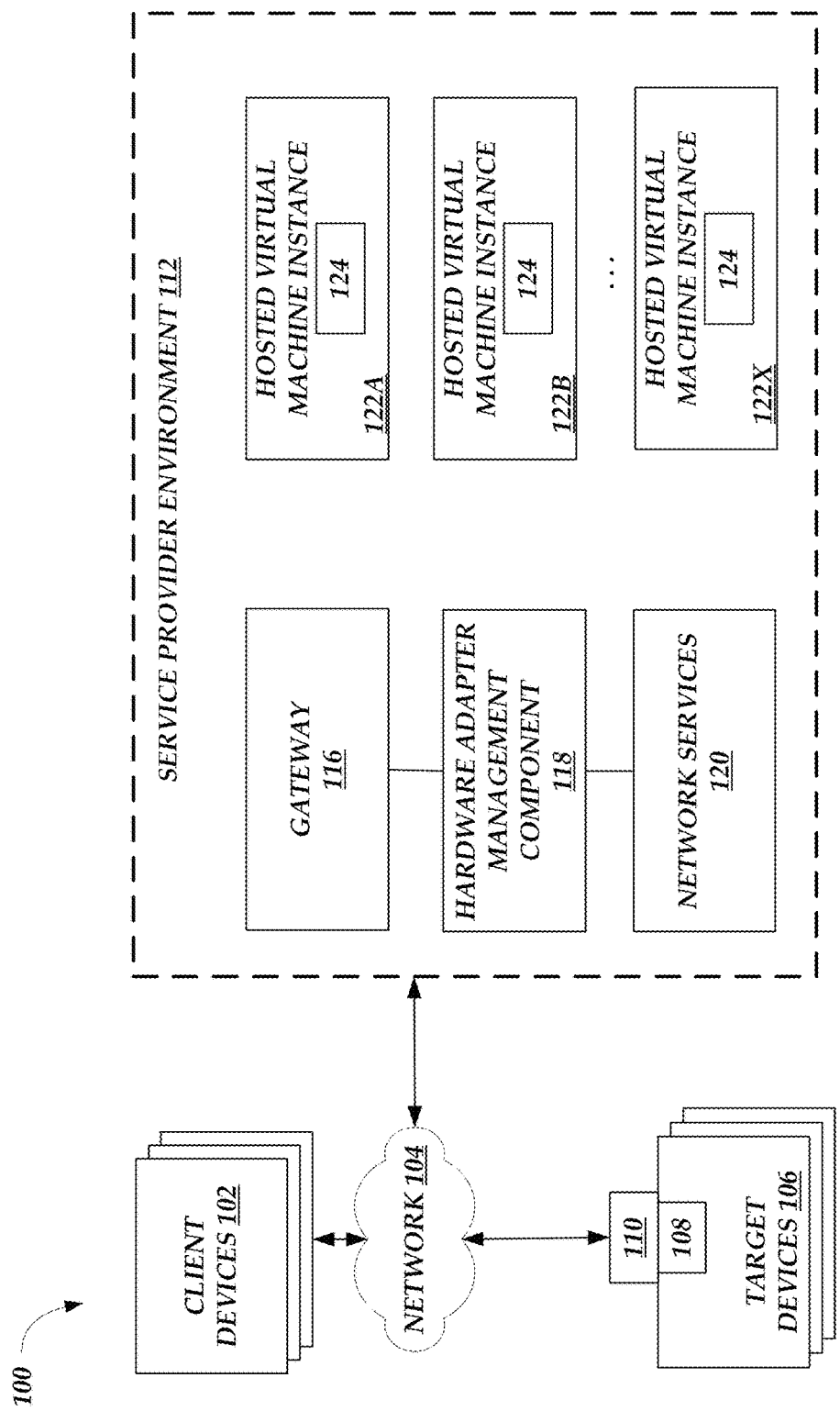
FIG. 1 is a block diagram depicting an illustrative environment in which a hardware serial adapter can be utilized to establish a communication channel and transmit data from a physical computing device and network services.

Generally described, aspects of the present disclosure relate to a hardware serial adapter for transmitting device data transmitted from a physical device to a network-based service. The physical device may correspond to embedded devices or thin devices that have at least one alternative primary function, such as industrial appliances or specific-function devices having a separate primary purpose. Such devices may in some instances be referred to as "Internet-of-Things" devices, or "IoT" devices. Physical devices may include processing functionality and memory resources that facilitates the collection or generation and storage of data.

Generally described, some physical devices, such as IoT devices, may have more limited communication functionality that restricts or limits how data may be transmitted from the physical device. For example, an IoT device may require specific software functionality to establish secure communications with a network service, such as providing data to an instantiated virtual machine instance that can receive and process data. In some embodiments, the IoT device may not have the appropriate functionality to facilitate the interaction between the IoT device and a virtual instance. In other embodiments, access to, or exchanging data with, the virtual machine can be further associated with security procedures that restricts access to a network resources or the IoT device without receiving certification. Such deficiencies create scenarios in which the physical device is restricted in functionality for communicating data or for a network-based service from accessing data collected or generated by the physical computing device.

To address potential inefficiencies associated with distributed networks and some physical computing device, a hardware serial adapter can be connected to a serial port of a physical computing device. Illustratively, the connection can correspond to a direct connection between the hardware serial adapter and the target physical computing device or target device. The hardware serial adapter can then receive serial data transmitted in accordance with a serial transmission protocol. The physical computing device or target device does not need to provide authentication information in order to establish transmission of the serial data via the serial data port.

The hardware serial adapter is associated with network credentials that include a unique hardware identifier and other security information for contacting a distributed network service. Upon receipt of data (or other initiation command), the hardware serial adapter transmits a registration request with the network credentials to a network service. The hardware serial adapter can be configured with network address information, such as a resource identifier, that allows for the transmission of the registration request. If the network credentials are valid, the network service provides communication channel configuration information and session credentials to establish a secure communication for the transmission of data from the hardware serial adapter to a virtual machine instance. The hardware serial adapter includes a transceiver component that facilitates the processing of data between a serial communication protocol between the hardware serial adapter and the physical computing device and a network communication protocol between the hardware serial adapter and the virtual machine instance that is part of the distributed network service. The distributed network service can control and manage data transmissions and the communication channel. For example, the distributed network service can invalidate or revoke the communication channel credentials to prevent subsequent transmission of data. The network service can also limit the communication channel such that the transmission of the data may be limited to a single direction, namely, from the hardware serial adapter to the virtual machine instance.

One or more aspects of the present application will be described with regard to the implementation of specific communication protocols, such as specific serial communication protocols. However, such examples are illustrative in nature and should not necessarily be construed as limiting.

As will be appreciated by one of skill in the art in light of the present disclosure, the embodiments disclosed herein improve the ability of computing systems, and particularly computing systems with limited communication functionality, to be coordinated and managed by an external device. Specifically, the present disclosure provides a configurable hardware component for transmitting data between network services and physical computing devices in a reliable manner. Thus, the embodiments disclosed herein provide more responsive control of physical devices as well as increased security in data provided by physical computing device. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100, including one or more target devices 106, or physical computing devices, that may interact with a service provider environment 112. Each of the target devices 106 can obtain, collect, generate, or store data for transmission to a distributed network service provided by the service provider environment 112. Additionally, each target device 106 can correspond to a computing device configured to communicate via communication ports, such as serial communication port 108. In some instances, the target computing device 106 can correspond to fully featured computing devices, such as laptops, desktops, standalone media players, etc., with robust localized user interface capabilities. In other instances, target computing device 106 can correspond to thin devices or embedded devices associated with another primary function, such as a device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the target devices 106 may include limited local user interfaces, and be configured for remote management. In some instances, the target devices 106 may be stateful, and operate to alter their state in response to instructions (e.g., by turning from "off" to "on," etc.). Illustrative components of the target devices 106 will be described with regard to FIGS. 3A and 3B.

The environment 100 further includes individual hardware serial adapters 110 that are configured to make a direct connection to an output port of the target devices 106. Illustratively, the output port of the target devices 106 can correspond to a serial output port that can transmit serial data in accordance with a serial communication protocol, such as the rs-232, rs-422, or rs-485 standards. The hardware serial adapter 110 can be configured and utilized to initiate communication with the service provider environment 112. Based on validating network communications, the hardware serial adapter 110 can then establish a secure communication channel with an instantiated virtual machine instances to transmit, receive or exchange data via a network protocol. Illustrative components of the hardware serial adapter 110 will be described with regard to FIG. 2.

Client devices 102 may include a variety of computing devices enabling a user to communicate with the hardware serial adapters 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programing interfaces (API), and/or other programmatic interfaces for interacting with the service provider environment 120, such as to submit a configuration for an target device 106. Illustrative components of the client device 102 will be described with regard to FIG. 4.

The client devices 102, hardware serial adapter 110 and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. In some instances, communications between the hardware serial adapter 110 and service provider environment 112 may be encrypted, such as via Transport Layer Security cryptographic protocol. Illustratively, the hardware serial adapter 110 may be provisioned with a security certificate that verifies a digital identify of the target device 106 or the hardware serial adapter 110. The security certificate may be signed by a public certificate authority or a private certificate authority (e.g., established by the service provider environment 112).

The service provider environment 112 can include a number of components elements to enable configuration of, management of, and communications with hardware serial adapter 110. Specifically, the service provider environment 112 includes a gateway component 116 to manage communications between an individual hardware serial adapter 110 and an instantiated virtual machine instance. The service provider environment can further include a hardware adapter management component 118 to manage the authentication of individual hardware serial adapters 110 and the communication channels between an individual hardware serial adapter 110 and an instanced virtual machine instance. The service provider environment 112 further includes a plurality of network services to facilitate the validation of individual hardware serial adapters 110 and the management of communication channels. The plurality of network services can include security components configured to provide and maintain software security credentials, security components configured to manage hardware identifiers or credentials, or other communication services. The service provider environment 112 can further include a plurality of physical computing devices configured to host one or more instantiated virtual machine instances 122. Individual instantiated virtual machine instances 122 can include a virtual communication port 124 that receives data from a hardware serial adapter 110 via a communication channel.

The service provider environment 112 is depicted in FIG. 1 as operating in a distributed computing environment including several computer systems that are interconnected using one or more computer networks (not shown in FIG. 1) and is generally referred to as a distributed network. Illustratively, a distributed network or distributed system can include various components on different network computing devices or components that interact via the transmission of messages. As will be discussed, the hardware serial adapter 110 can communicate with the service provider environment 112 (e.g., the distributed network) in a manner that is not a direct connection between the target device 106 and a single network component, but rather communication between the target device 106, via the hardware serial adapter 110, to the service provider environment 112 and is routed to individual instantiated virtual machine instances 122. The service provider environment 112 could also operate within a computing environment having a fewer or greater number of devices than are illustrated in FIG. 1. Thus, the depiction of the service provider environment 112 in FIG. 1 should be taken as illustrative and not limiting to the present disclosure. For example, the service provider environment 112 or various constituents thereof could implement various Web services components, hosted or "cloud" computing environments, and/or peer to peer network configurations to implement at least a portion of the processes described herein.

Further, the service provider environment 112 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
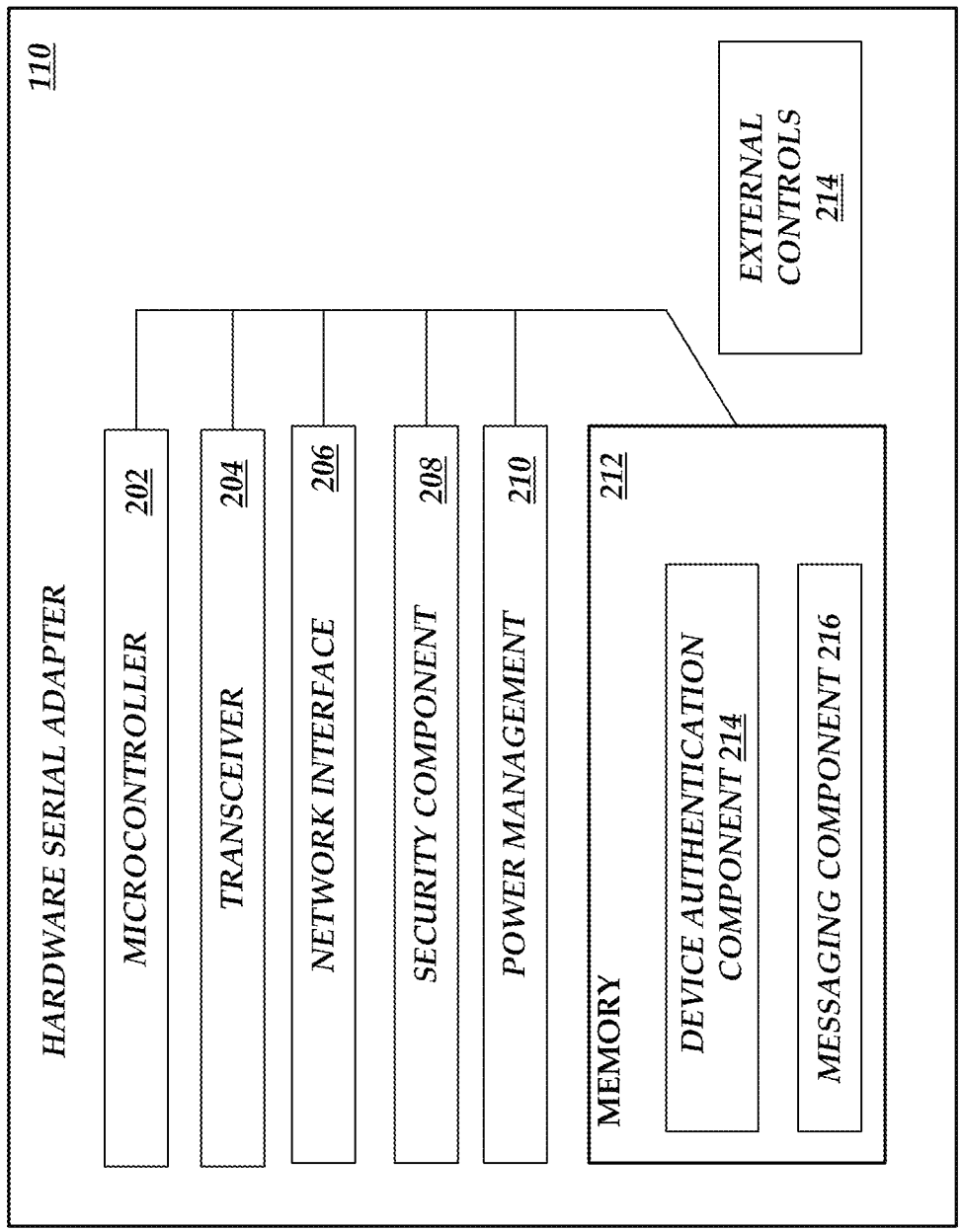
FIG. 2 depicts a general architecture illustrative of a hardware serial adapter in accordance with illustrative embodiments.

FIG. 2 depicts a general architecture of a computing system or apparatus corresponding to the hardware serial adapter 110. The general architecture of the hardware serial adapter 110 depicted in FIG. 2 includes an arrangement of computer hardware and software components that may be used to implement aspects of the present disclosure. As illustrated, the hardware serial adapter 110 includes a microcontroller 202 that can execute computer-readable instructions to implement one or more functions of the hardware serial adapter 110. The hardware serial adapter 110 also includes a transceiver 204 that functions to receive data encoded or transmitted in accordance with one protocol and process the received data for communication in accordance with a different communication protocol. Illustratively, the transceiver 204 can receive data encoded in a serial communication protocol and process the received data for transmission in accordance with a network protocol or vice-versa. The hardware serial adapter 110 further includes a network interface 206 for transmission in accordance with a network protocol.

The hardware serial adapter 110 further includes a number of additional or optional components for implementing different functions of the hardware serial adapter 110. The additional components can include a security component 208 for managing network credentials, such as hardware credentials and software credentials. The additional components can include a power management component 210 for operating in a lower-power mode such that the hardware serial adapter 110 transitions to a power-up state or active state based on events. Such events can include the receipt of data, connection of the serial port or the like. As will be explained in greater detail, the hardware serial adapter 110 can be associated with a unique identifier, such as an assigned hardware identifier or a hash based on various hardware components, to facilitate management of communications involving the hardware serial adapter 110. The hardware serial adapter 110 can be configured with software credentials or other software network credentials to facilitate in the management communications. The security component 208 or other component can maintain and manage the hardware and software credentials.

The memory 212 may include computer program instructions that the microcontroller 202 executes in order to implement one or more embodiments. The memory 212 generally includes RAM, ROM or other persistent or non-transitory memory. In this embodiment, the memory 212 may store a device authentication component 214 for facilitating the collection of network credentials and transmit to a virtual machine instance. In some embodiments, the memory 212 can further include a messaging component 216 for facilitating the exchange of data between the hardware serial adapter 110 and an instantiated virtual machine instance 122. Illustratively, one or more portions of the memory 212 can be partitioned such that different components may be stored in memory having different characteristics, such as dynamic and static memory components. For example, the device authentication component 214 may be maintained in a static partition of memory 212 (e.g., firmware, field programmable gate array (FPGA) logic, etc.), which the messaging component 216 may be maintained in a dynamic partition of memory 212 (e.g., flash memory, random access memory, etc.). During certain events, such as entering a low-power mode or receiving a reset condition, one or more components, such as the messaging component 216 would be removed from the dynamic memory 212. In some embodiments, the hardware serial adapter 110 can include one or more controls or inputs that can generate input signals to the microcontroller. Illustratively, the external controls can correspond to buttons, switches, accelerometers, sensors, microphones, speakers, and the like. The external controls 214 can be utilized to provide input for determining events associated with the operation of the hardware serial adapter 110, such as controls to initiate data connection, detect manipulation, measure environmental conditions, and the like.

Figure 3A:
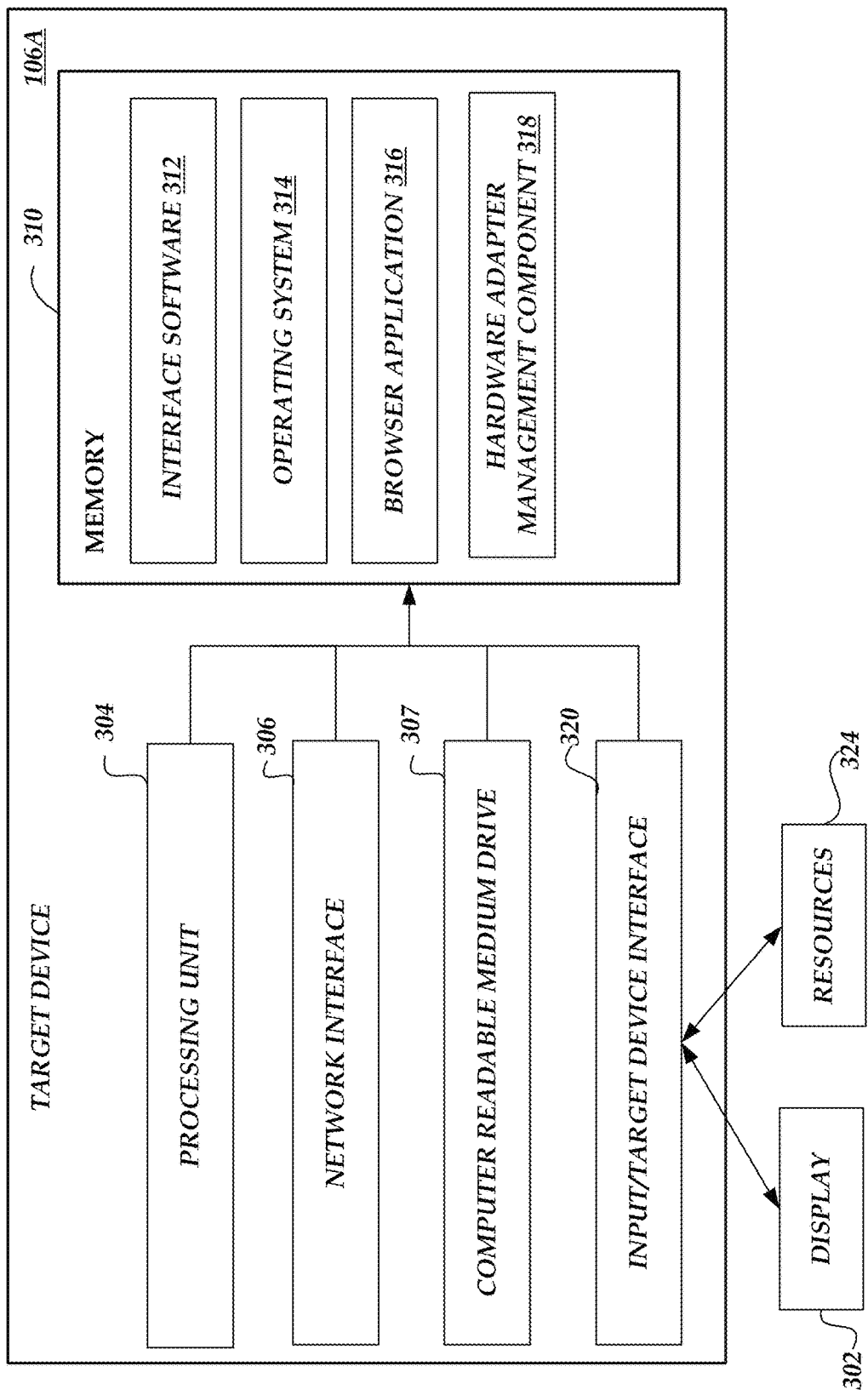
FIGS. 3A and 3B depict general architectures of physical computing devices that may connect with a hardware serial adapter in accordance with illustrative embodiments.

FIG. 3A depicts one embodiment of an architecture of an illustrative target device 106A in accordance with the present application. The general architecture of the target device 1006A depicted in FIG. 3A includes an arrangement of computer hardware and software components that may be used to implement aspects of the present disclosure. As illustrated, the target device 106A includes a processing unit 304, a network interface 306, a computer readable medium drive 307, an input/target device interface 320, an optional display 302, and an input device 324, all of which may communicate with one another by way of a communication bus. Illustratively, the target device 106A includes at least a serial output port 108 supported via the input/output interface 320.

The network interface 306 may provide connectivity to one or more networks or computing systems, such as the network 104 of FIG. 1. The processing unit 304 may thus receive information and instructions from other computing systems or services via a network. As will be described in greater detail below, individual target devices 106A may be configured to receive a set of inputs, such as specific types of data required to implement one or more functions or generate data. For example, a target device 106A corresponding to a badge reader, would be configured to receive a badge number encoded as a bar code. Similarly, individual target devices 106A may be configured to generate a set of outputs, such as specific types of data resulting from the implementation of one or more function. For example, a target device 106A corresponding to a temperature sensor could be configured to generate data indicative of a measured temperature or a binary indication of whether a temperature threshold had been exceeded. Still further, individual target devices 106A may be configured with a set of interfaces or communication protocols that establish formats and specific protocols receiving or transmitting communications. For example, a target device 106A may be configured to receive communications in accordance with any of the protocols identified previously, such as MQTT, as well with specific APIs that identify the order and format for data. Additionally, target devices 106A can also be configured with regard to additional security protocols, such as encryption, compression protocols, or other protocols related to the exchange of information between target devices 106A (or other components).

The processing unit 304 may also communicate to and from memory 310 and further provide output information for an optional display 302 via the input/target device interface 320. The input/target device interface 320 may also accept input from local resources 324, such as a specialized processor (e.g., graphics processing units), memory, optimized chipsets, etc. In some embodiments, the target device 106A may include more (or fewer) components than those shown in FIG. 3A. For example, some embodiments of the target device 106A may omit the display 302 and input device 324, while providing input/output capabilities through one or more alternative communication channel (e.g., via the network interface 306).

The memory 310 may include computer program instructions that the processing unit 304 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the target device 106A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be an interface software application (or executable instructions) that provide for data connectivity. In some embodiments, the memory 310 can further include a hardware adapter management component 318 for managing one or more aspects of the hardware serial adapter 110 connected to the target device 106A. For purposes of the present disclosure, the target device 106A may only require a component or functionality to transmit or receive data via a communication port, such as serial port 108. In this regard, the target device 106 would require the necessary input/output functions for facilitating data transmission in accordance with specific communication ports (e.g., a serial port) and communication protocols (e.g., a serial communication protocol). In such a scenario, it would appear, from the perspective of target device 106A, that a traditional serial cable has been plugged in to connect the target device 106A with another local computing device. However, the hardware serial adapter 110 enables what appears like a local computing device, at least to target device 106A, to actually be a distributed network service. Thus, in such a scenario, the functionality of target device 106A would not need to be adapted to accommodate hardware serial adapter 110. As such, hardware serial adapter 110 can be utilized on legacy field devices to enable the data to be offloaded to a distributed network service, which would traditionally need a person to go to the location of the legacy field device in order to offload data from the device.

In different embodiments, the target device 106A can include the illustrated hardware adapter management component 318 to facilitate the configuration or control of the hardware serial adapter 110, such as providing software credential information or providing network locations or configurations for the network service provider environment 112. Accordingly, the hardware adapter management component 318 can be considered optional.

Figure 3B:
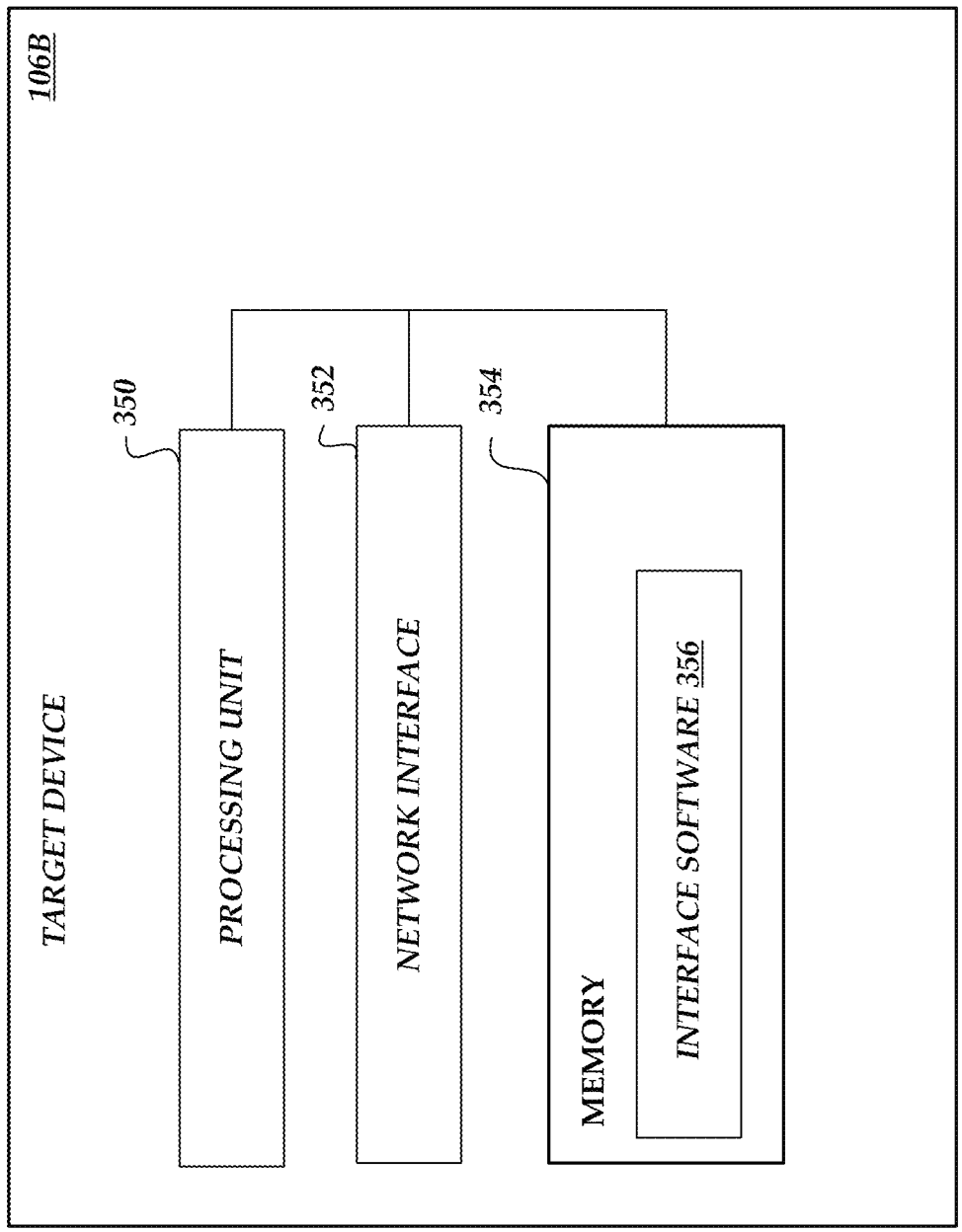

FIG. 3B depicts one embodiment of an alternative architecture of an illustrative target device 106B in accordance with the present application. The general architecture of the target device 106B depicted in FIG. 3B includes an arrangement of computer hardware and software components that may be used to implement aspects of the present disclosure. However, the target device 106B may be associated with a reduced set of components that may limit the computing functionality and operation of the target device 106B. As illustrated, the target device 106B includes a processing unit 350 and a network interface 352 that communicate with a communication bus. The network interface 352 illustratively includes a serial port interface 108, such as that discussed in reference to FIG. 1. Unlike target device 106A of FIG. 3A, the target device 106B may not have a computer readable medium drive, an optional display, or an input device. However, for purposes of the present application, the target device 106B could have some local resources that can be accessed during the execution of a task.

The network interface 352 may provide connectivity to one or more networks or computing systems, such as the network 104 of FIG. 1. The processing unit 350 may thus receive information and instructions from other computing systems or services via a network. As will be described in greater detail below, individual target devices 106B may be configured to receive a set of inputs, such as specific types of data required to implement one or more functions. For example, a target device 106B corresponding to a thermostat, may be configured to receive temperature settings or time settings for adjusting environmental controls. Similarly, individual target devices 106B may be configured to generate a set of outputs, such as specific types of data resulting from the implementation of one or more function. For example, a target device 106B corresponding to a motion sensor could be configured to generate data indicative of a binary indication of whether a threshold amount of motion had been detected. Still further, individual target device 106 may be configured with a set of interfaces or communication protocols that establish formats and specific protocols receiving or transmitting communications. For example, a target device 106B may be configured to receive communications in accordance with any of the protocols identified previously, such as TCP, as well with specific APIs that identify the order and format for data. Additionally, target devices 106B can also be configured with regard to additional security protocols, such as encryption, compression protocols, or other protocols related to the exchange of information between target devices 106B (or other components).

The memory 354 may include computer program instructions that the processing unit 350 executes in order to implement one or more embodiments. The memory 354 generally includes RAM, ROM or other persistent or non-transitory memory. In some embodiments, the memory 354, as well as any combination of logical components discussed herein, may be implemented via a programmable integrated circuit, such as a field programmable gate array (FPGA). In this embodiment, the memory 354 may store a full operating system that provides computer program instructions for use by the processing unit 350 in the general administration and operation of the target device 106B. Rather, in one embodiment, the memory 354 includes an interface software component 356 for accessing receiving and processing instructions. In some embodiments, the memory 310 can further include an agent software application 358 for establishing a communication channel with the service provider environment 112 to facilitate interaction with the local resources 324. Similar to the description above, the target device 106B may only require a component or functionality to transmit or receive data via a communication port, such as serial port 108. In this regard, the target device 106B would require the necessary input/output functions for facilitating data transmission in accordance with specific communication ports (e.g., a serial port) and communication protocols (e.g., a serial communication protocol). Because target device 106B is illustrated as a more limited functionality target device, it is illustrated without a hardware adapter management component. However, the hardware adapter management component 318 can be considered as an optional addition to target device 106B.

Figure 4:
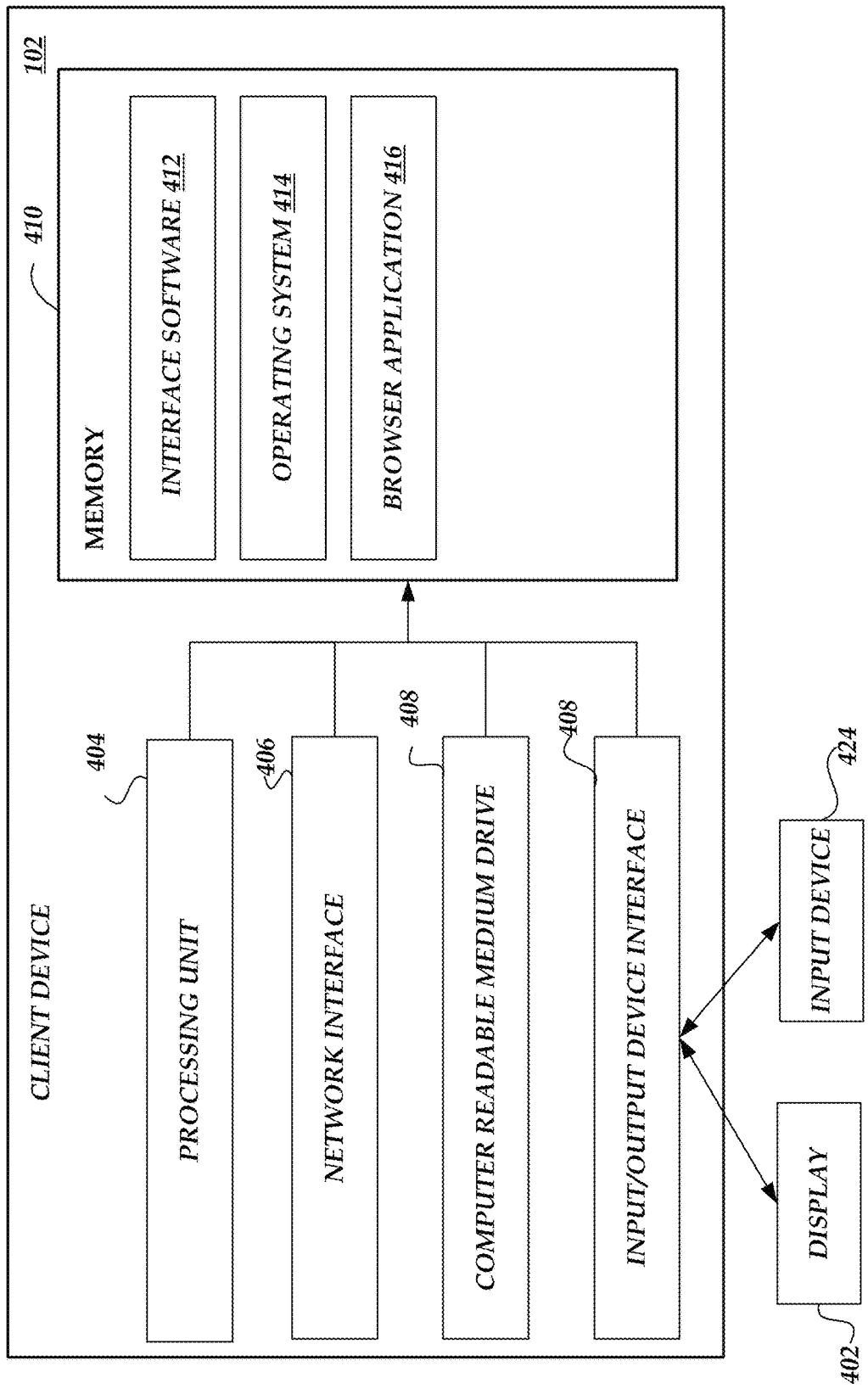
FIG. 4 depicts a general architecture of client device that may be utilized to generate and submit configuration of hardware serial adapters in accordance with illustrative embodiments.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/target device interface 408, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/target device interface 408. The input/output device interface 408 may also accept input from the optional input device 424, such as a keyboard, mouse, digital pen, etc. In some embodiments, the client device 102 may include more (or fewer) components than those shown in FIG. 4. For example, some embodiments of the client device 102 may omit the display 402 and input device 424, while providing input/output capabilities through one or more alternative communication channel (e.g., via the network interface 406). Additionally, the client device 102 may omit the input and output interface 408 altogether as well.

The memory 410 may include computer program instructions that the processing unit 204 executes in order to implement one or more embodiments. The memory 410 generally includes RAM, ROM or other persistent or non-transitory memory. The memory 410 may store interface software 412 for establishing communications via network 104 in accordance with one of various network communication protocols. Additionally, memory 410 includes an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity for providing configuration information or other instructions related to the hardware serial adapter 110 or instantiated virtual machine instances 122, depicted and discussed elsewhere herein.

Figure 5:
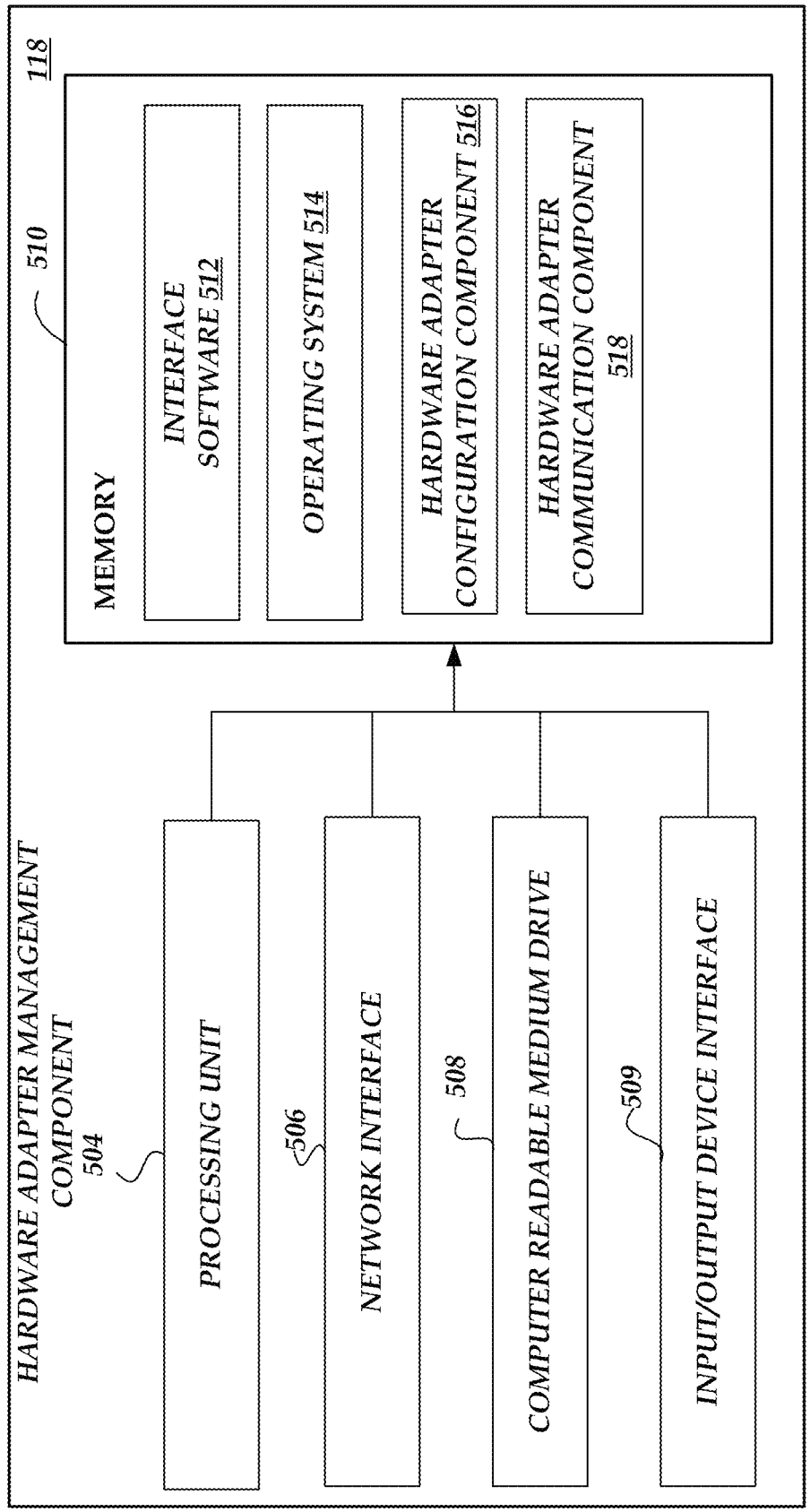
FIG. 5 depicts a general architecture of a hardware serial adapter management component that may be utilized to manage the configuration and management of hardware serial adapters with a network service in accordance with illustrative embodiments.

FIG. 5 depicts one embodiment of an architecture of an illustrative computing device for implementing various aspects of the hardware adapter management component 118 in accordance with aspects of the present application. The hardware adapter management component 118 can be a part of the instantiation of virtual machine instances. Alternatively, the computing device may be a stand-alone device independent of the instantiated virtual machines.

The general architecture of the hardware serial adapter management component 118 depicted in FIG. 5 includes an arrangement of computer hardware and software components that may be used to implement aspects of the present disclosure. As illustrated, the computing device 500 includes a processing unit 504, a network interface 506, a computer readable medium drive 508, an input/output device interface 509, all of which may communicate with one another by way of a communication bus. The components of the computing device 500 may be physical hardware components or implemented in a virtualized environment.

The network interface 506 may provide connectivity to one or more networks or computing systems, such as the network of FIG. 1. The processing unit 504 may thus receive information and instructions from other computing systems or services via a network. The processing unit 504 may also communicate to and from memory 510 and further provide output information. In some embodiments, the computing device 500 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the hardware adapter management component 118. The memory 510 may further include computer program instructions and other information for implementing aspects of the present disclosure. For example, in one embodiment, the memory 510 includes interface software 512 for receiving and processing requests from user devices 102 or transmitting processed results. Memory 510 includes a hardware adapter configuration component 516 for configuring or managing the network credentials utilized to validate individual hardware serial adapters 110 or establish communication channels. The memory 510 further includes a hardware adapter communication component 518 for managing the communication channels between hardware serial adapter 110 and the instantiated virtual machine instance 122, including the invalidation of network credentials.

As specified above, in one embodiment, the hardware serial adapter management component 118 illustrated in FIG. 5 can be implemented as physical computing devices or virtualized computing devices in a computing network. In another embodiment, the hardware adapter management component 118 may be implemented as logical components in a virtual computing network in which the functionality of the hardware adapter management component 118 is implemented by an underlying substrate network of physical computing devices. Thus, aspects of the present application should not be limited to interpretation requiring a physical, virtual or logical embodiment unless specifically indicated as such.

Figure 6A:
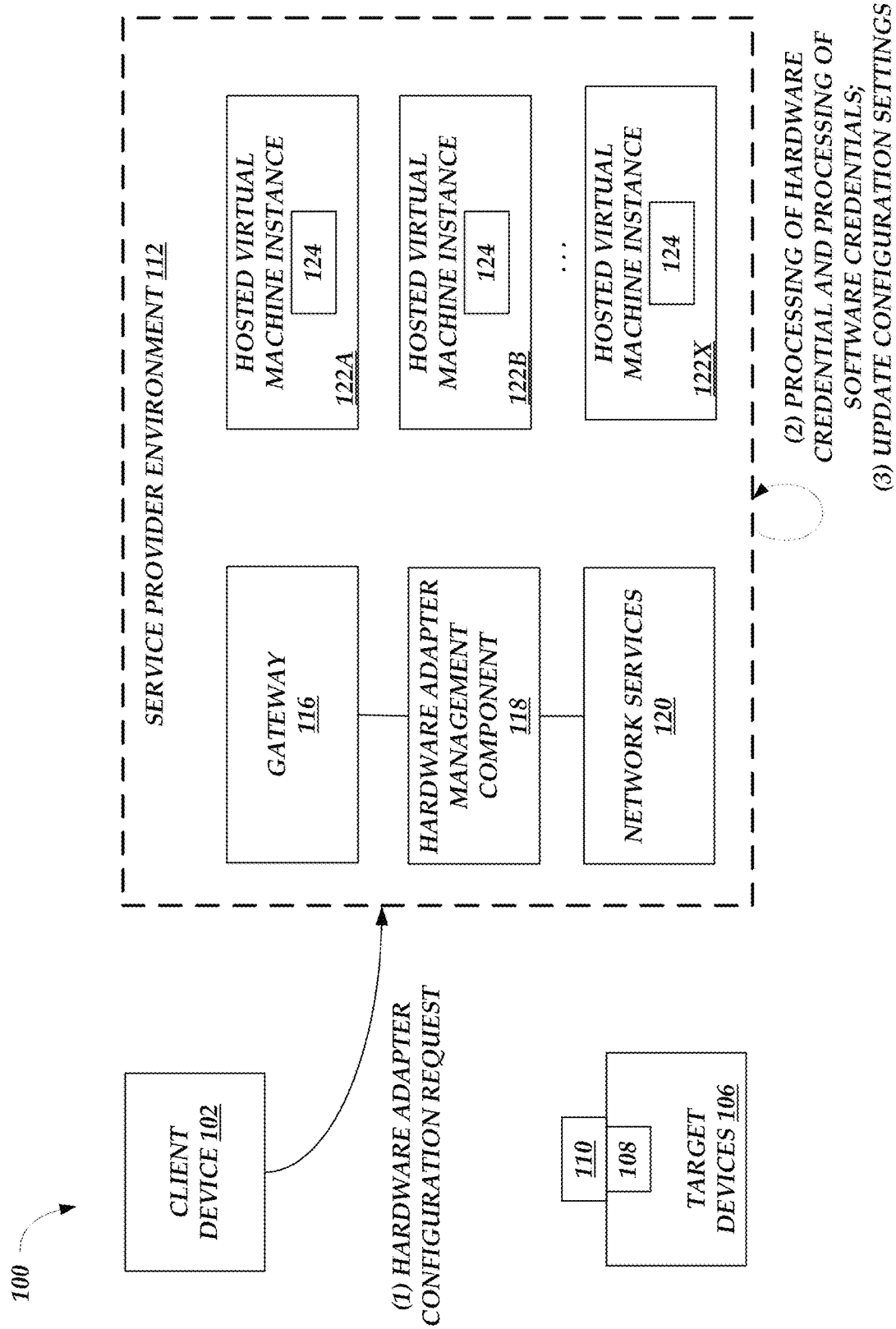
FIGS. 6A-6C are block diagrams of the environment of FIG. 1 illustrating the coordination and management of communications between a physical computing, hardware serial adapter and network services in accordance with illustrative embodiments.
Figure 6B:
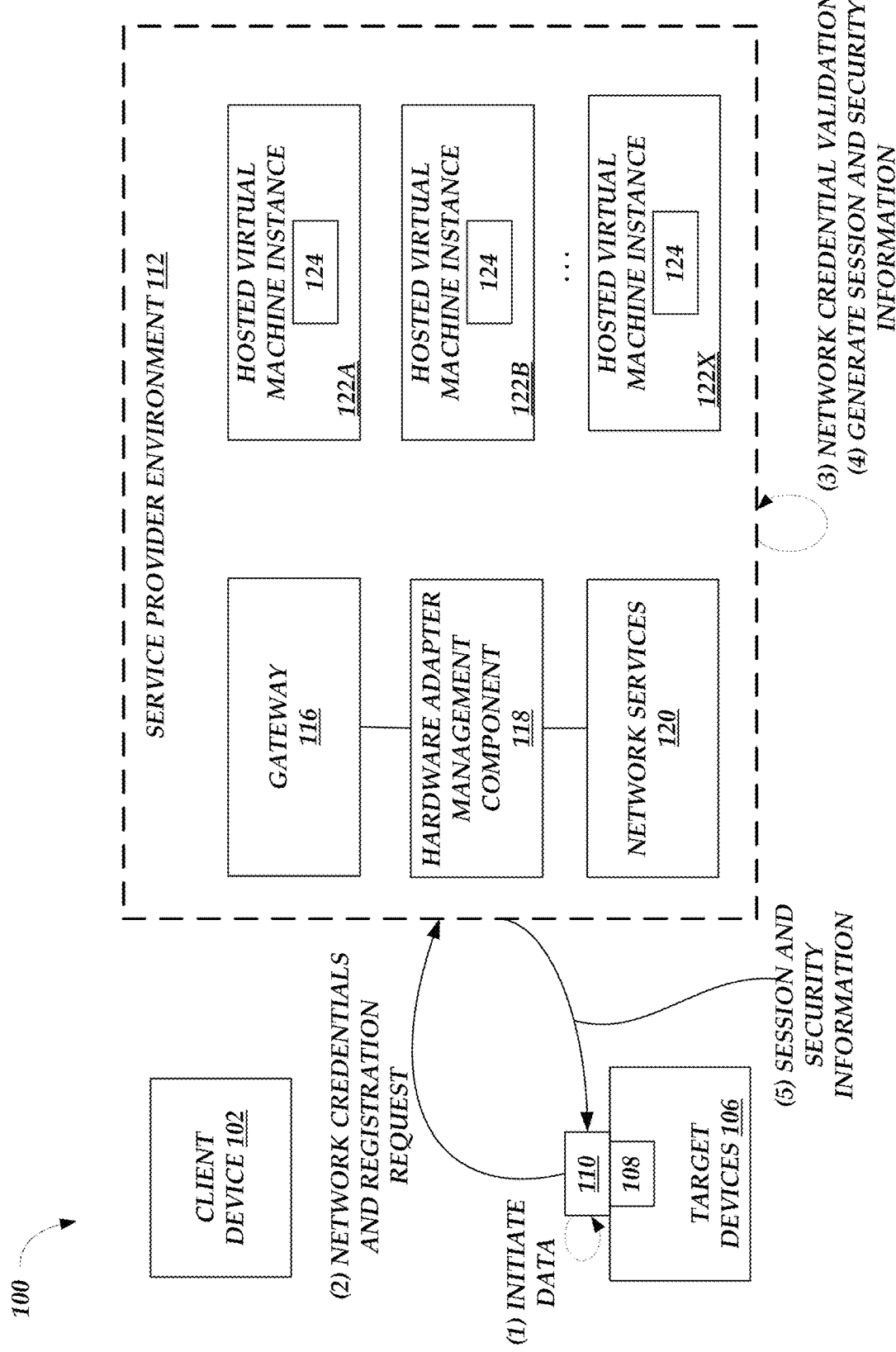
Figure 6C:
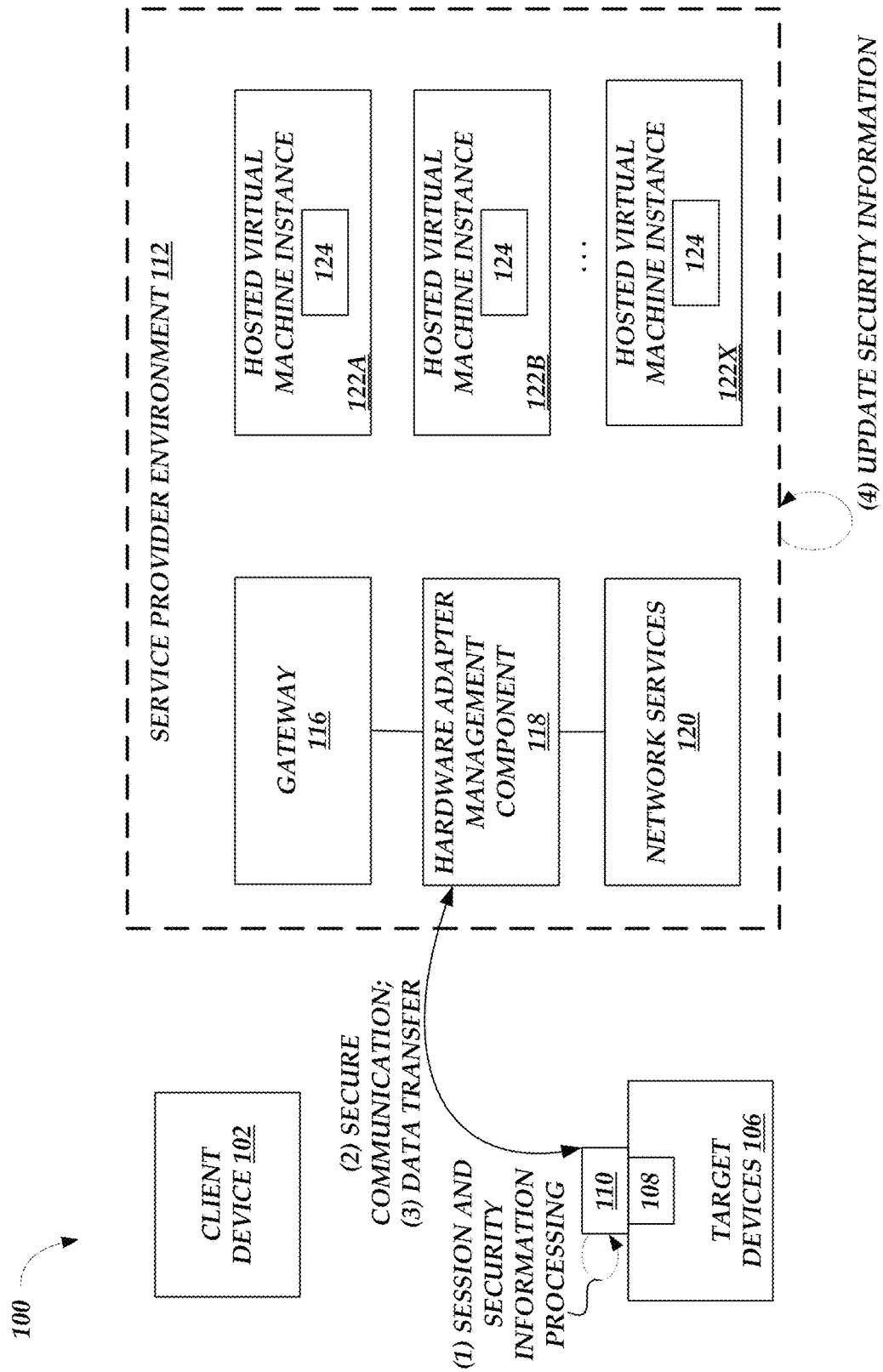

Turning now to FIGS. 6A-6C, illustrative embodiments for the processing and the transmission of data between a hardware serial adapter 110 connected to a physical computing device (e.g., target device 106) and an instantiated virtual machine instance 122 will be described. With reference to FIG. 6A, interactive for configuration of the hardware serial adapter 110 will be described. The interaction of FIG. 6A can occur during an initial configuration of a hardware serial adapter 110 or to alter a previous configuration of a hardware serial adapter 110, such as to invalidate a previous authorization/configuration. At (1), a client device 102 transmits a hardware adapter configuration request to a service provider environment 112, such as the hardware adapter management component 118. Illustratively, the hardware adapter configuration request can include the hardware credentials of one or more hardware serial adapters 110, software credentials for one or more hardware serial adapters, and requests/configurations related to the establishment of communication channels or the transmission of data via a communication channel. For example, the request can include the identification of types or classes of virtual machine instances that can communicate with individual hardware serial adapters. The request can include the specification of whether data can be transmitted solely from the hardware serial adapter 110 to instantiated virtual machine instance 122 (e.g., unidirectional data flow) or whether bi-directional data flow is enabled. The request can further identify criteria that determines the validity of the availability for communication flow, including time-criteria, event criteria, etc. The request can also include explicit commands for determining whether the communication channel remains valid.

At (2), the service provider environment 112 processing the request, which can include generating validation criteria for the hardware and software credentials that will be transmitted by the hardware serial adapter 110. At (3), the service provider environment 112 updates configuration settings responsive to the request, such as implementing or modifying any of the above-illustrated examples. In some embodiments, the service provider environment 112 may utilize authentication or permissions to determine whether the requested modifications or configurations are allowed. For example, a service provider may set limits as to the number or types of modifications that may be allowed. The interaction illustrated in FIG. 6A may be implemented at various times in addition to an initial configuration, such as to make modifications to default settings or make additional configuration changes during the transmission of data.

With reference now to FIG. 6B, an illustrative interaction for the transmission of data from a hardware serial adapter 110 will be described. For purposes of illustration, it is assumed that the hardware serial adapter 110 has made a physical connection to the target device 106 by direct connection to the serial port 108 or via a cable. At (1), the hardware serial adapter 110 receives an instruction or command to initiate a data transfer. In one embodiment, the command to initiate a data transfer can correspond to receipt of data from the physical computing device (or target device 106) via the connected serial port 108. In other embodiments, the instruction or command can correspond to explicit command, such as via graphical user interface or physical hardware buttons on the target device 106 or the hardware serial adapter 110. In still a further embodiment, the hardware serial adapter 110 can include some near field communication capability that allows the hardware serial adapter 110 to receive commands from a user, such as a system administrator. Still further, in other embodiments, one or more of the controls (e.g., a temperature sensor or accelerometer) may generate an input signal indicative of an event or that can be processed to determine an event (e.g., a fire or an attempt to remove the hardware serial adapter 110) that can cause the initiation of a data transfer session.

At (2), responsive to the command to initiate, the hardware serial adapter 110 transmits network credentials and a registration request to the service provider environment 112. As described above, illustratively, the network credentials can be configures to include hardware credentials and software credentials that identify the hardware serial adapter 110 to the hardware adapter management component 118 and that can be utilized to establish a communication channel with an instantiated virtual machine instance. The hardware credentials can include a unique hardware identifier that is assigned or based on the hardware serial adapter 110. The software credentials can include certificates provided by the service provider environment 112. Illustratively, the hardware serial adapter 110 can access the service provider environment 112 to obtain additional or alternative network credentials via a resource identifier maintained by the hardware serial adapter 110. In that regard, the network service provider environment 112 can utilize network services 120 to provide, modify or update any of the network credentials utilized by the hardware serial adapter 110. Accordingly, the hardware serial adapter 110 may be pre-configured with at least a resource identifier, portion of the network credentials or all the initial network credentials utilized to communicate with the service provider environment. This may be stored, for example, in static memory to prevent tampering with this information. In other embodiments, the hardware serial adapter 110 can interface with intermediary services or configuration components that can authenticate the hardware serial adapter 110 and provide network credential information. Additionally, the registration request can include information identifying the target device 106 or other information related to a communication network, physical location and the like.

At (3), the service provider environment 112 receives the network credentials and processes the credentials to determine whether the hardware and software credentials (e.g., the network credentials are valid). In this regard, the service provider environment 112 can evaluate additional information, such as time of day, network identifiers, target device identifiers and the like in making the determination. If the service provider environment 112 determines that the network credential are valid, at (4), the service provider environment 112 generates session and security information for establishing a secure communication channel between the service provider environment 112 and the hardware serial adapter 110. The session and security information can include information that can be used to establish a secure communication channel in accordance with a network-based communication protocol. The specific network protocol may be configured by a system administrator or otherwise set by the service provider environment 112. At (5), the session and security information is transmitted to the hardware serial adapter 110.

With reference now to FIG. 6C, once the session and security information is received (FIG. 6B), the hardware serial adapter 110 processes the received session and security and establishes a secure communication channel with an instantiated virtual machine instance 122 of the service provider environment 112. Illustratively, the secure communication channel can correspond to one of a variety of network communication protocols that utilize the session credentials and software credentials provided by the service provider environment 112. The secure communication channel illustrated in FIG. 6C is illustratively a two-way secure communication channel allowing the hardware serial adapter 110 to both transmit and receive data from the service provider environment 112. In other configuration, the secure communication channel can be configured such that the hardware serial adapter 110 can only transmit data to the service provider environment 112. In yet another configuration, the secure communication channel can be configured such that the service provider environment 112 can only transmit information to the hardware serial adapter 110. Illustratively, the secure communication channel can be established until the hardware serial adapter 110 or the service provider environment 112 terminate the connection. In other embodiments, the secure communication channel can be configured such that the secure communication channel is automatically terminated after an established time period, amount of data transmitted or other established criteria. At (4), the service provider environment 112 evaluates the security information or other expiration criteria to determine when the communication channel may be terminated. Additionally, in some embodiments, the hardware serial adapter 110 or service provider environment 112 can also utilize input signals provided by the hardware serial adapter 110 (e.g., environmental sensors) to determine when to terminate or update the secure communication channel. For example, the hardware serial adapter 110 can obtain an indication that the hardware serial adapter 110 has been touched or manipulated, such as via touch sensors, accelerometers, temperature sensors, moisture sensors, etc. In such embodiments, either the hardware serial adapter 110 or the service provider environment 1112 can terminate the communication channel on the basis that the hardware serial adapter 110 may have been compromised. Additionally, the hardware serial adapter 110 (directly or indirectly) can cause the deleting or flushing of memory components that may include data transmitted to or from the service provider environment 112.

Turning now to FIG. 7, a routine 700 implemented by the hardware serial adapter 110 for processing the configuration and transmission of data will be described. Routine 700 can be initiated after the service provider environment 112 has received and processed a hardware adapter configuration request as described above and the hardware serial adapter 110 is ready to be connected to a target device, such as physical computing device. As described above, the hardware adapter configuration request can include the hardware credentials of one or more hardware serial adapters 110, software credentials for one or more hardware serial adapters, and requests/configurations related to the establishment of communication channels or the transmission of data via a communication channel. For example, the request can include the identification of types or classes of virtual machine instances that can communicate with individual hardware serial adapters. The request can include the specification of whether data can be transmitted solely from the hardware serial adapter 110 to instantiated virtual machine instance 122 (e.g., unidirectional data flow) or whether bi-directional data flow is enabled. The request can further identify criteria that determines the validity of the availability for communication flow, including time-criteria, event criteria, etc. The request can also include explicit commands for determining whether the communication channel remains valid.

At block 702, the hardware serial adapter 110 receives an instruction or command to initiate a data transfer. In one embodiment, the command to initiate a data transfer can correspond to receipt of data from the physical computing device (or target device 106) via the connected serial port 108. In other embodiments, the instruction or command can correspond to explicit command, such as via graphical user interface or physical hardware buttons on the target device 106 or the hardware serial adapter 110. In still a further embodiment, the hardware serial adapter 110 include some near field communication capability that allows the hardware serial adapter 110 to receive commands from a user, such as a system administrator.

At block 704, responsive to the command to initiate, the hardware serial adapter 110 transmits network credentials and a registration request to the service provider environment 112. As described above, illustratively, the network credentials can include hardware credential and software credentials that identify the hardware serial adapter 110 to the hardware serial adapter 110 and that can be utilized to establish a communication channel with an instantiated virtual machine instance. The hardware credentials can include a unique hardware identifier that is assigned or based on the hardware serial adapter 110. The software credentials can include certificates provided by the service provider environment 112. As previously described, the hardware serial adapter 110 can access the service provider environment 112 to obtain additional or alternative network credentials via a resource identifier maintained by the hardware serial adapter 110. In that regard, the network service provider environment 112 can utilize network services 120 to provide, modify or update any of the network credentials utilized by the hardware serial adapter 110. Accordingly, the hardware serial adapter 110 may be pre-configured with at least a resource identifier, portion of the network credentials or all the initial network credentials utilized to communicate with the service provider environment. In other embodiments, the hardware serial adapter 110 can interface with intermediary services or configuration components that can authenticate the hardware serial adapter 110 and provide network credential information. Additionally, the registration request can include information identifying the target device 106 or other information related to a communication network, physical location and the like.

Illustratively the service provider environment 112 receives the network credentials and processes the credentials to determine whether the hardware and software credentials (e.g., the network credentials are valid). In this regard, the service provider environment 112 can evaluate additional information, such as time of day, network identifiers, target device identifiers and the like in making the determination. If the service provider environment 112 determines that the network credential are valid, the service provider environment 112 generates session and security information for establishing a secure communication channel between the service provider environment 112 and the hardware serial adapter 110. The session and security information can include information that can be used to establish a secure communication channel in accordance with a network-based communication protocol. The specific network protocol may be configured by a system administrator or otherwise set by the service provider environment 112.

At block 706, the hardware serial adapter 110 receives and processes the received session and security and establishes a secure communication channel with an instantiated virtual machine instance 122 of the service provider environment 112 at block 708. Illustratively, the secure communication channel can correspond to one of a variety of network communication protocols that utilize the session credentials and software credentials provided by the service provider environment 112. As described above, the secure communication channel, illustratively a two-way secure communication channel, can allow the hardware serial adapter 110 to both transmit and receive data from the service provider environment 112. In another configuration, the secure communication channel can be configured such that the hardware serial adapter 110 can only transmit data to the service provider environment 112. In yet another configuration, the secure communication channel can be configured such that the service provider environment 112 can only transmit information to the hardware serial adapter 110. Illustratively, the secure communication channel can be established until the hardware serial adapter 110 or the service provider environment 112 terminate the connection. In other embodiments, the secure communication channel can be configured such that the secure communication channel is automatically terminated after an established time period, amount of data transmitted or other established criteria.

At block 710, the hardware serial adapter 110 causes the transmission of data via the established communication channel. The process can continue as long as the communication channel remains established or the hardware serial adapter 110 determines to terminate the communication channel. Illustratively, the transmission of data between the hardware serial adapter 110 and the network service provider environment 112 can be bidirectional or unidirectional and can be further updated or modified. As described above, in some embodiments, the hardware serial adapter 110 or service provider environment 112 can also utilize input signals provided by the hardware serial adapter 110 (e.g., environmental sensors) to determine when to terminate or update the secure communication channel. For example, the hardware serial adapter 110 can obtain an indication that the hardware serial adapter 110 has been touched or manipulated, such as via touch sensors, accelerometers, temperature sensors, moisture sensors, etc. In such embodiments, either the hardware serial adapter 110 or the service provider environment 1112 can terminate the communication channel on the basis that the hardware serial adapter 110 may have been compromised. Additionally, the hardware serial adapter 110 (directly or indirectly) can cause the deleting or flushing of memory components that may include data transmitted to or from the service provider environment 112.

Figure 8:
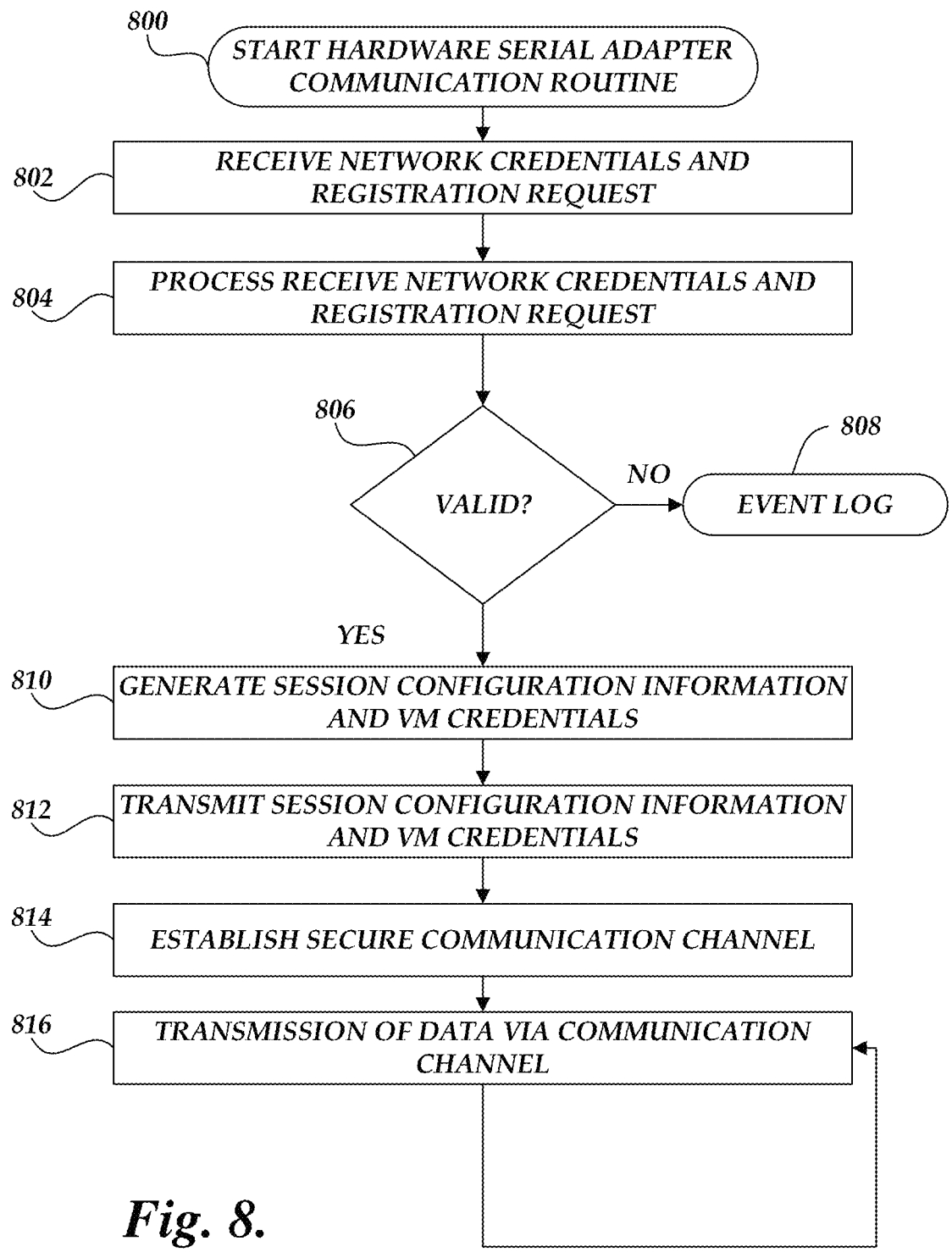
FIG. 8 is a flow diagram depicting an illustrative hardware serial adapter communication routine implemented by one or more components of a network service in accordance with illustrative embodiments.

Turning now to FIG. 8, a routine 800 implemented by the service provider environment 112 for processing the configuration and transmission of data with a hardware serial adapter 110 will be described. Routine 800 can be initiated after the service provider environment 112 has received and processed a hardware adapter configuration request as described above and the hardware serial adapter 110 is ready to be connected to a target device, such as physical computing device. As described above, the hardware adapter configuration request can include the hardware credentials of one or more hardware serial adapters 110, software credentials for one or more hardware serial adapters, and requests/configurations related to the establishment of communication channels or the transmission of data via a communication channel. For example, the request can include the identification of types or classes of virtual machine instances that can communicate with individual hardware serial adapters. The request can include the specification of whether data can be transmitted solely from the hardware serial adapter 110 to instantiated virtual machine instance 122 (e.g., unidirectional data flow) or whether bi-directional data flow is enabled. The request can further identify criteria that determines the validity of the availability for communication flow, including time-criteria, event criteria, etc. The request can also include explicit commands for determining whether the communication channel remains valid. Still further, in some embodiments, the hardware serial adapter 110 can request one or more of the network credentials from the network service provider 112, such as via a uniform resource identifier directing communications for obtaining software credentials from a network service 120.

As described above, the hardware serial adapter 110 receives an instruction or command to initiate a data transfer. In one embodiment, the command to initiate a data transfer can correspond to receipt of data from the physical computing device (or target device 106) via the connected serial port 108. In other embodiments, the instruction or command can correspond to explicit command, such via graphical user interface or physical hardware buttons on the target device 106 or the hardware serial adapter 110. In still a further embodiment, the hardware serial adapter 110 include some near field communication capability that allows the hardware serial adapter 110 to receive commands from a user, such as a system administrator.

At block 802, the service provider environment 112 receives the network credentials and registration request from the hardware serial adapter 110. As described above, illustratively, the network credentials can include hardware credential and software credentials that identify the hardware serial adapter 110 to the hardware serial adapter 110 and that can be utilized to establish a communication channel with an instantiated virtual machine instance. The hardware credentials can include a unique hardware identifier that is assigned or based on the hardware serial adapter 110. The software credentials can include certificates provided by the service provider environment 112. Additionally, the registration request can include information identifying the target device 106 or other information related to a communication network, physical location and the like.

At block 804, the service provider environment 112 processes the credentials to determine whether the hardware and software credentials (e.g., the network credentials are valid. In this regard, the service provider environment 112 can evaluate additional information, such as time of day, network identifiers, target device identifiers and the like in making the determination. At decision block 806, a test is conducted to determine if the network credentials are valid. If not, the routine 800 terminates at block 808. Illustratively, the service provider environment 112 can generate log data or other event capture indicative of the authentication failure. If, alternatively, the service provider environment 112 determines that the network credential are valid, at block 810, the service provider environment 112 generates session and security information for establishing a secure communication channel between the service provider environment 112 and the hardware serial adapter 110. The session and security information can include information that can be used to establish a secure communication channel in accordance with a network-based communication protocol. The specific network protocol may be configured by a system administrator or otherwise set by the service provider environment 112.

As described above, the hardware serial adapter 110 receives and processes the received session and security. At block 814, the service provider environment 112 establishes a secure communication channel with the hardware serial adapter 110. Illustratively, the secure communication channel can correspond to one of a variety network communication protocols that utilize the session credentials and software credentials provided by the service provider environment 112. As described above, the secure communication channel illustratively a two-way secure communication channel allowing the hardware serial adapter 110 to both transmit and receive data from the service provider environment 112. In other configuration, the secure communication channel can be configured such that the hardware serial adapter 110 can only transmit data to the service provider environment 112. In yet another configuration, the secure communication channel can be configured such that the service provider environment 112 can only transmit information to the hardware serial adapter 110. Illustratively, the secure communication channel can be established until the hardware serial adapter 110 or the service provider environment 112 terminate the connection. In other embodiments, the secure communication channel can be configured such that the secure communication channel is automatically terminated after an established time period, amount of data transmitted or other established criteria. At block 816, the service provider environment 112 receives and processes the transmission of data via the established communication channel, which can include unidirectional or bi-directional communications. The process can continue as long as the communication channel remains established or the service provider environment 112 determines to terminate. As described above, in some embodiments, the hardware serial adapter 110 or service provider environment 112 can also utilized input signals provided by the hardware serial adapter 110 (e.g., environmental sensors) to determine when to terminate or update the secure communication channel. For example, the hardware serial adapter 110 can obtain an indication that the hardware serial adapter 110 has been touched or manipulated, such as via touch sensors, accelerometers, temperature sensors, moisture sensors, etc. In such embodiments, either the hardware serial adapter 110 or the service provider environment 112 can terminate the communication channel on the basis that the hardware serial adapter 110 may have been compromised. Additionally, the hardware serial adapter 110 (directly or indirectly) can cause the deleting or flushing of memory components that may include data transmitted to or from the service provider environment 112.

While referred to throughout this disclosure as a hardware serial adapter, it will be appreciated that the hardware adapter is not limited to a serial embodiment and that this was merely for the sake of illustration. It will be appreciated that any type of hardware data connection is envisioned as falling within the scope of this disclosure and should not be limited to only serial ports, but any port that is capable of transmitting data (e.g., parallel ports, custom data transmission ports, etc.)

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An apparatus for facilitating communications between physical computing devices and network services, the apparatus comprising:
   a serial port interface for directly connecting to a serial port of a physical computing device, wherein the serial port interface is configured to communicate in accordance with a serial data communication protocol, and wherein the apparatus and the physical computing device are separate devices connected via the serial port interface;
   a transceiver component for receiving serial data from the serial port interface component and processing the serial data for communication in accordance with a network communication protocol;

a network interface component for transmitting the processed serial data in accordance with a network communication protocol; and a microcontroller for executing computer-executable instructions that when executed by the microcontroller cause the apparatus to implement:

a serial hardware serial adapter authentication component for establishing a communication channel on behalf of the physical computing device by:

transmitting network credentials to a distributed network service responsive to the receipt of the serial data from the physical computing device, wherein the network credentials are not stored on the physical computing device, and further wherein the network credentials enables at least an identification of a type of virtual machine instance, receiving communication channel configuration and session credentials from the distributed network service, and establishing the communication channel with a virtual machine instance hosted on the distributed network service responsive to receipt of the communication channel configuration and the session credentials from the distributed network service; and a messaging component for causing the transmission of the processed serial data via the established communication channel.

2. The apparatus of claim 1 further comprising a power management component for transitioning the apparatus into a power-up state responsive to receipt of an initiation command.

3. The apparatus of claim 1, wherein the transceiver component is further configured to process network data received from the distributed network service for transmission to the physical computing device via the serial port interface component.

4. The apparatus of claim 1, wherein the network credentials include a hardware identifier and security information.

5. The apparatus of claim 1, wherein the messaging component restricts the transmission of the data to serial data from the physical device to the distributed network service.

6. A computer-implemented method to manage transmission of data via a hardware adapter, the method comprising:

obtaining an instruction to transmit data from a physical computing device to a distributed network service, wherein the data from the physical computing device is transmitted to the hardware adapter via direct connection with an output port of the physical computing device, wherein the hardware adapter and the physical computing device are separate devices connected via the output port of the physical computing device;

establishing, by the hardware adapter, a secure communication channel on behalf of the physical computing device by:

transmitting a set of hardware credentials and software credentials to the distributed network service responsive to the instruction to transmit data, wherein the set of hardware credentials and software credentials are not stored by the physical computing device, and further wherein the set of hardware credentials and software credentials enables at least an identification of a type of virtual machine instance, responsive to a validation of the set of hardware credentials and software credentials, receiving communication session configuration information and additional network credentials from the distributed network service, and establishing the secure communication channel with a virtual machine instance hosted on the distributed network service based on the communication session configuration information and additional network credentials;

receiving data from the physical computing device via a device interface; and transmitting the received data to the virtual machine instance via the secure communication channel.

7. The computer-implemented method of claim 6, wherein the hardware credentials correspond to a unique hardware identifier associated with the hardware adapter.

8. The computer-implemented method of claim 6, wherein the software credentials correspond to a certificate provided by the distributed network service.

9. The computer-implemented method of claim 6 further comprising receiving data from the virtual machine instance for transmission to the physical computing device via the secure communication channel.

10. The computer-implemented method of claim 9 further comprising transmitting the received data to the physical computing device via the direct connection.

11. The computer-implemented method of claim 6 further comprising limiting the direct connection with the output port of the physical computing device to receiving information from the physical computing device.

12. The computer-implemented method of claim 6, wherein obtaining an instruction to transmit data from a physical computing device to a network service includes receiving data from the output port of the physical computing device.

13. The computer-implemented method of claim 6 further comprising causing a transition to a power-up state responsive to receipt of the instruction to transmit data from the physical computing device.

14. The computer-implemented method of claim 6, wherein receiving data from the physical computing device via a device interface includes receiving data in accordance with a serial transmission protocol.

15. The computer-implemented method of claim 6, wherein transmitting data to the virtual machine instance includes transmitting data in accordance with a network transmission protocol.

16. A computer-implemented method to manage transmission of data between a distributed network service and a physical computing device via a hardware adapter, the method comprising:

obtaining, from the hardware adapter requesting a communication session on behalf of the physical computing device, a set of hardware credentials and software credentials by the distributed network service, wherein the hardware adapter and the physical computing devices are separate devices connected via a serial port interface, and wherein the set of hardware credentials and software credentials are not stored on the physical computing device, further wherein the set of hardware credentials and software credentials enable at least an identification of a resource of the distributed network service and a configuration of the resource of the distributed network service;

responsive to a validation of the set of hardware credentials and software credentials, transmitting, to the hardware adapter, communication session configuration information and additional network credentials from the distributed network service;

establishing, by the distributed network service, a secure communication channel with the hardware adapter based on the communication session configuration information and additional network credentials; and receiving data generated by the physical computing device via the secure communication channel between the distributed network service and the hardware adapter.

17. The computer-implemented method of claim 16, wherein the hardware credentials correspond to a unique hardware identifier associated with the hardware adapter and the software credentials correspond to a certificate provided by the distributed network service.

18. The computer-implemented method of claim 16 further comprising transmitting data from a virtual machine instance for transmission to the physical computing device via the secure communication channel.

19. The computer-implemented method of claim 16 further comprising updating the communication session information based on an event.

20. The computer-implemented method of claim 19, wherein updating the communication session information includes invalidating the communication channel.

21. The computer-implemented method of claim 19, wherein invalidating the communication channel includes invalidating the communication channel based on input from the hardware adapter.

22. The computer-implemented method of claim 16, wherein receiving data from the hardware serial adapter includes receiving data in accordance with a network transmission protocol.

* * * * *